United States Patent [19]
Heitmann et al.

[11] 3,869,390

[45] Mar. 4, 1975

[54] ELECTROMAGNETIC FILTER

[75] Inventors: Hans-Günther Heitmann, Erlangen-Buckenhof; Gerhard Donath, Erlangen, both of Germany

[73] Assignee: Kraftwerk Union Aktiengesellschaft, Mulheim/Ruhr, Germany

[22] Filed: Dec. 22, 1972

[21] Appl. No.: 317,772

[30] Foreign Application Priority Data
Dec. 22, 1971 Germany................ 2163696

[52] U.S. Cl. ............................................ 210/222
[51] Int. Cl. ........................................... B01d 35/06
[58] Field of Search ............................ 210/222, 186

[56] References Cited
UNITED STATES PATENTS
3,059,910  10/1962  Moriya.................... 210/222 UX FOREIGN PATENTS OR APPLICATIONS
1,816,859  8/1970  Germany................. 210/222
1,012,871  8/1957  Germany................. 210/222

*Primary Examiner*—Frank A. Spear, Jr.
*Assistant Examiner*—Ferris H. Lander
*Attorney, Agent, or Firm*—Herbert L. Lerner

[57] ABSTRACT

An electromagnetic filter for removing iron oxide from the feed water of boilers in steam power plants includes a filter bed of metal balls disposed within a vessel and an excitation coil located about the vessel in the ova of the filter bed. The excitation coil has passages for passing a cooling medium and a jacket disposed about the excitation coil has inlet openings and outlet openings for the cooling medium. The arrangement being such that the jacket serves to facilitate passage of the cooling medium while providing a magnetic yoke for improving the magnetization of the metal balls.

3 Claims, 1 Drawing Figure

PATENTED MAR 4 1975　　　　　　　　　　　　　　3,869,390
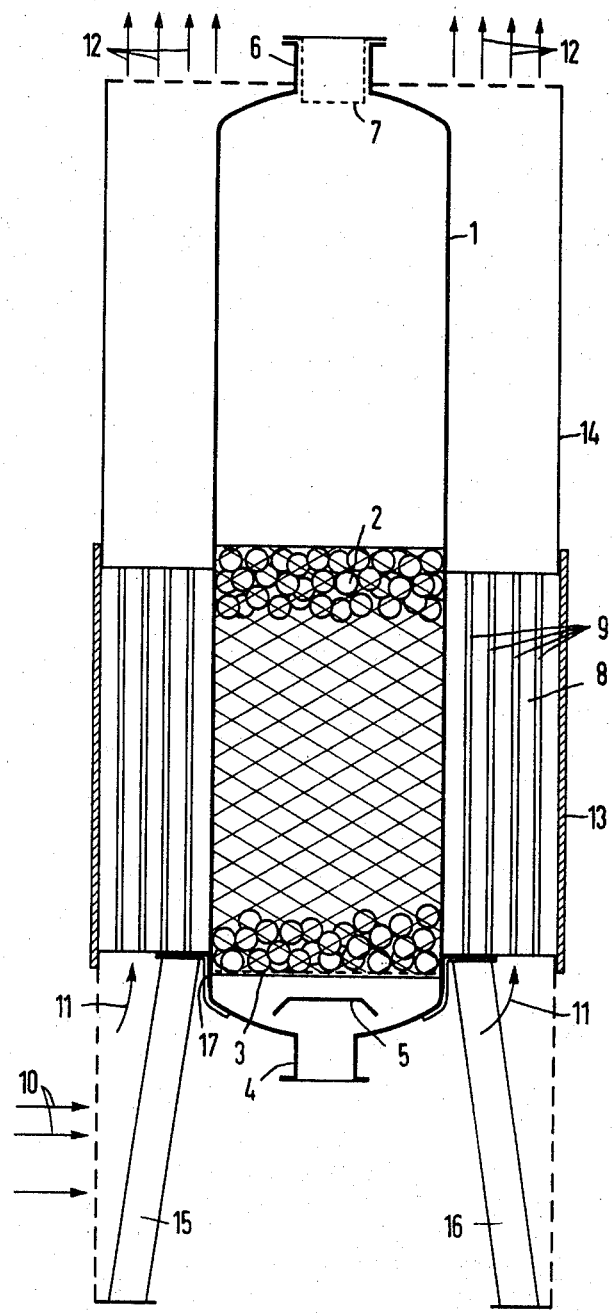

ELECTROMAGNETIC FILTER

This invention relates to an electromagnetic filter for removing iron oxides from the feed water of boilers in steam power plants. An essentially cylindrical filter vessel of the electromagnetic filter has disposed therein a filter bed of hard-magnetic steel balls and surrounds the vessel in the area of the filter bed whereby the field intensity produced by the excitation coil lies substantially above the saturation field intensity of the steel balls.

Heretofore when a magnetic field is applied to known filters of this type, high field intensity gradients occur in the spaces between the balls which are arbitrarily installed in the filter bed, at the localities where the contact axis of the balls has a vector in the direction of the field intensity. A field intensity concentration occurs at these localities. It has been found that only extraordinarily high field intensities which are considerably higher than the saturation field intensity of the steel balls permit an excellent separation of fine magnetic particles. In order to produce such high field intensities of, for example, at least 400 Oersted, high excitation currents are naturally required, so that the excitation coil must be rated for high electric power.

Accordingly, it is an object of the present invention to increase the current capacity of the coil relative to the field intensity produced and to improve the heat dissipation.

To this end and in accordance with the present invention, the coil which is used for exciting the magnetic field and which includes air gaps between individual or several windings for the passage of cooling air or other coolants, is enclosed all around by an iron or steel jacket in a manner that on the one hand, adequate openings for the inlet and outlet of the coolant passage will be formed, and on the other hand, the magnetic stray field of the coil will be extensively shielded and concentrated within the jacket. In natural draft cooling, this produces a chimney effect or when blowers or fans are employed for blowing or drawing-in the cooling air, a defined channel for the coolant will be formed. Naturally, it would also be possible to use water or another liquid coolant in the same manner.

In order to protect the coils against foreign or other mechanical impurities, the jacket may be equipped at its bottom end and, if necessary, also at its upper end with a perforated plate or sheet, screen, or a sieve netting. It is equally possible to provide both ends with perforated end caps whose perforations are so rated and of such a size that they will still provide the required rate of air flow.

The coil may be held by a support structure which functions, at the same time, as a support for the filter vessel. The filter vessel is then disposed so deep inside the coil that the ball filling bed extends by a certain amount, for example 10 centimeter, below the lower boundary of the ball filling. The height of the ball filter bed may also be chosen with respect to the height of the coil such that the ball filling bed extends by a certain amount, for example, about 10 centimeter, above the upper boundary of the coil. As a result, the magnetic force lines which emerge at the ends of the coil will also be utilized for the magnetic flux within the filter vessel. In connection therewith, the steel jacket with appropriately dimensioned wall thickness functions as a magnetic yoke which increases the magnetizing effect in the vicinity of the ball filling.

Other features which are considered as characteristic for the invention are set forth in the appended claims.

Although the invention is illustrated and described in relationship to specific embodiments, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing which is a schematic elevational view, partly in section, of an electromagnetic filter according to one embodiment of the invention.

Referring to the drawing, there is shown a cylindrical filter vessel 1 in which there is disposed a filter bed 2 made up of balls, the individual balls being hard-magnetic balls which, if necessary, may be provided with a coating or covering having anti-corrosive properties. For example, the balls may be made of steel or they may be made of nickel and plated with chromium. The balls rest on a perforated or sieve bottom 3 and the boiler feed water which is to be purified, enters the vessel 1 below through an inlet connective flange 4. The entering boiler feed water is then distributed by a means of a baffle plate 5 and is uniformly distributed across the entire area of the perforated bottom 3 upon entering the filter bed 2. The filtered feed water exits from the filter vessel 1 through an outlet connection 6. A perforated element or sieve 7 prevents any balls that may possibly have been swept along with the flowing water from escaping from the filter vessel 1.

The filter vessel 1 is at least partially surrounded by an excitation coil 8 which is designed for high electric power. In order to provide for cooling, air gaps 9 are formed between individual or several windings. Cooling air which enters in the direction of the arrows 10 and 11 is permitted to pass through the air gaps 9. The cooling air flows upward in the direction of the arrows 12. The coil 8 is enclosed by a protective jacket 13 which is preferably made of steel and which not only effects a confinement of the air flow, but is also so proportioned with respect to its wall thickness that it serves as a magnetic yoke. The upper part 14 of the protective jacket on the other hand, is utilized only for guiding the coolant air and therefore requires a relatively thin wall thickness with corresponding mechanical strength.

The entire arrangement is mounted on a support structure 15, 16. A ring-shaped body 17 equipped with openings provides support for the coil 8 as well as for the filter vessel 1. The coil 8 is so dimensioned with regard to its height and its arrangement with respect to the filter bed that the ball filling 2 extends, upwardly and downwardly approximately 10 centimeter beyond the limits of the coil.

The electric power capacity of the coil has high values not only for the excitation of the filter but also because high demagnetizing currents become necessary during the rinsing process since not only the filter bed which consists of steel balls has high remagnetization work requirements, but the hard magnetic balls also require appropriately high magnetic fields for demagnetizing. For producing the operational DC voltage, a thyristor control may be used which is so constructed that it can also serve for the demagnetization. A decaying AC voltage of low frequency or a chopped DC of alternately opposite polarity may permit lowering the currents down to zero.

We claim:

1. Electromagnetic filter for removing iron oxides from the feed water of boilers in steam power plants of the type having a cylindrical filter vessel, a filter bed of hard-magnetic steel balls and being enclosed by an excitation coil having passages for the passage of coolants, wherein the field intensity produced by said excitation coil is considerably above the saturation field intensity of the steel balls; a magnetic yoke comprising a protective steel jacket surrounding the coil, the wall thickness of said jacket being proportioned in the vicinity of the excitation coil, so as to serve as a magnetic yoke, the ball filling of the filter bed and the thickened part of the protective jacket extending upwardly and downwardly beyond the excitation coil, and an annular body provided with recesses located below the excitation coil and the filter vessel for the support thereof.

2. Filter according to claim 1, wherein the protective jacket is constructed as a perforated sheet having a sieve meshing.

3. Filter as claimed in claim 1, wherein the protective jacket is covered, at least on the upper end thereof, with a perforated sheet.

* * * * *